United States Patent
Takahashi et al.

(10) Patent No.: US 11,142,182 B2
(45) Date of Patent: Oct. 12, 2021

(54) CONTROL DEVICE OF HYBRID VEHICLE

(71) Applicant: TOYOTA JIDOSHA KABUSHIKI KAISHA, Toyota (JP)

(72) Inventors: Tomoya Takahashi, Ebina (JP); Mitsuhiro Tabata, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 249 days.

(21) Appl. No.: 16/369,683

(22) Filed: Mar. 29, 2019

(65) Prior Publication Data

US 2019/0329758 A1 Oct. 31, 2019

(30) Foreign Application Priority Data

Apr. 26, 2018 (JP) .............................. JP2018-085258

(51) Int. Cl.
| | | |
|---|---|---|
| *B60W 20/13* | (2016.01) | |
| *G01C 21/36* | (2006.01) | |
| *B60L 58/13* | (2019.01) | |
| *B60W 20/12* | (2016.01) | |

(52) U.S. Cl.
CPC ............. *B60W 20/13* (2016.01); *B60L 58/13* (2019.02); *B60W 20/12* (2016.01); *G01C 21/3679* (2013.01)

(58) Field of Classification Search
CPC ....... B60W 20/13; B60W 20/12; B60L 58/13; G01C 21/3679
See application file for complete search history.

(56) References Cited

U.S. PATENT DOCUMENTS

2008/0262667 A1 10/2008 Otabe

FOREIGN PATENT DOCUMENTS

| JP | 2003294463 A | * 10/2003 | .............. B60L 58/12 |
|---|---|---|---|
| JP | 2008-100645 A | 5/2008 | |
| JP | 2008-238972 A | 10/2008 | |
| JP | 2010-279108 A | 12/2010 | |
| JP | 2012-78251 A | 4/2012 | |
| WO | WO-2015094807 A1 | * 6/2015 | ................ B60L 3/12 |

OTHER PUBLICATIONS

English Translation of JP 2003294463 A.*

* cited by examiner

*Primary Examiner* — Jess Whittington
*Assistant Examiner* — Shahira Baajour
(74) *Attorney, Agent, or Firm* — Oliff PLC

(57) ABSTRACT

The control device of hybrid vehicle 1 comprises an output control part 41 configured to control outputs of the internal combustion engine 10 and the motor 16, a target SOC setting part 42 configured to set a target state of charge, and an arrival rate calculating part 43 configured to calculate a probability of the hybrid vehicle reaching the charging station. When the hybrid vehicle is being driven outside the charging station, the output control part is configured to control outputs of the internal combustion engine and the motor so that a state of charge of the battery when the hybrid vehicle reaches the charging station becomes the target state of charge. The target SOC setting part is configured to lower the target state of charge when the probability is relatively high compared to when the probability is relatively low.

16 Claims, 13 Drawing Sheets

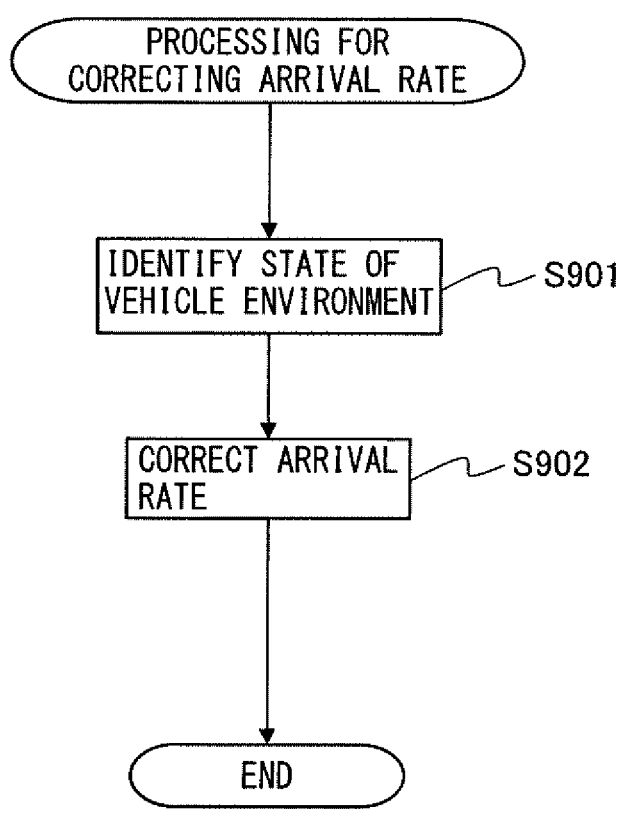

CONTROL DEVICE OF HYBRID VEHICLE

FIELD

The present invention relates to a control device of a hybrid vehicle.

BACKGROUND

Known in the art is a hybrid vehicle provided with an internal combustion engine, a motor, and a battery supplying electric power to the motor. In some hybrid vehicles, in order to charge the battery, it is possible to use not only the output of the internal combustion engine, but also an external power source.

In a hybrid vehicle able to use an external power source to charge a battery (for example, a plug-in hybrid), ideally the electric power charged to the battery is used up before the next charging by an external power source of a charging station. Due to this, it is possible to keep the operating time of the internal combustion engine to a minimum and in turn possible to improve the fuel efficiency and exhaust emission of the hybrid vehicle.

Further, when driving a hybrid vehicle by only output of the motor from the current location to a charging station, the longer the distance from the current location to the charging station, the greater the amount of electric power required until reaching the charging station. For this reason, in the hybrid vehicle described in PTL 1, the outputs of the internal combustion engine and motor are controlled so that a state of charge of the battery becomes a target state of charge, and as the hybrid vehicle approaches the charging station, the target state of charge is made lower.

CITATION LIST

Patent Literature

[PTL 1] Japanese Unexamined Patent Publication No. 2010-279108

SUMMARY

Technical Problem

However, the driver of a hybrid vehicle changes the destination as the occasion demands while driving. For this reason, even if the hybrid vehicle is being driven near a charging station, sometimes the hybrid vehicle will not reach the charging station.

If the hybrid vehicle passes the charging station when the target state of charge at the charging station is substantially zero, the hybrid vehicle will not be able to use the electric power of the battery much at all. In this case, it is not possible to use the motor as a source of power for drive use or the output of the motor has to be limited, so the power performance of the hybrid vehicle falls.

Therefore, in consideration of the above technical issue, an object of the present invention is to shorten the operating time of the internal combustion engine while keeping down the drop in power performance of a hybrid vehicle.

Solution to Problem

The summary of the present disclosure is as follows.

(1) A control device of a hybrid vehicle for controlling a hybrid vehicle comprising an internal combustion engine, a motor, and a battery supplying electric power to the motor and able to be charged by output of the internal combustion engine and an external power source, the control device of a hybrid vehicle comprising: an output control part configured to control outputs of the internal combustion engine and the motor, a target SOC setting part configured to set a target state of charge which is a target value of a state of charge of the battery when the hybrid vehicle reaches a predetermined charging station, and an arrival rate calculating part configured to calculate a probability of the hybrid vehicle reaching the charging station, wherein when the hybrid vehicle is being driven outside the charging station, the output control part is configured to control outputs of the internal combustion engine and the motor so that a state of charge of the battery when the hybrid vehicle reaches the charging station becomes the target state of charge, and the target SOC setting part is configured to lower the target state of charge when the probability is relatively high compared to when the probability is relatively low.

(2) The control device of a hybrid vehicle described in above (1), wherein the arrival rate calculating part is configured to raise the probability the higher a frequency at which the hybrid vehicle has stopped at the charging station when being driven near the charging station.

(3) The control device of a hybrid vehicle described in above (2), wherein the arrival rate calculating part is configured to raise the probability if the hybrid vehicle stops at the charging station when being driven near the charging station, and lower the probability if the hybrid vehicle does not stop at the charging station when being driven near the charging station.

(4) The control device of a hybrid vehicle described in above (3), wherein the arrival rate calculating part is configured not to lower the probability if the state of charge of the battery is equal to or more than a predetermined value even if the hybrid vehicle does not stop at the charging station when being driven near the charging station.

(5) The control device of a hybrid vehicle described in above (4), wherein the arrival rate calculating part is configured not to raise the probability if the state of charge of the battery is equal to or more than the predetermined value even if the hybrid vehicle stops at the charging station when being driven near the charging station.

(6) The control device of a hybrid vehicle described in above (1), wherein the arrival rate calculating part is configured to raise the probability the higher a frequency at which the battery has been charged by the external power source at the charging station when the hybrid vehicle is being driven near the charging station.

(7) The control device of a hybrid vehicle described in above (6), wherein the arrival rate calculating part is configured to raise the probability if the battery is charged by the external power source at the charging station when the hybrid vehicle is being driven near the charging station, and lower the probability if the battery is not charged by the external power source at the charging station when the hybrid vehicle is being driven near the charging station.

(8) The control device of a hybrid vehicle described in above (7), wherein the arrival rate calculating part is configured not to lower the probability if the state of charge of the battery is equal to or more than a predetermined value even if the battery is not charged by the external power source at the charging station when the hybrid vehicle is being driven near the charging station.

(9) The control device of a hybrid vehicle described in above (8), wherein the arrival rate calculating part is configured not to raise the probability if the state of charge of the battery is equal to or more than the predetermined value even if the battery is charged by the external power source at the charging station when the hybrid vehicle is being driven near the charging station.

(10) The control device of a hybrid vehicle described in above (1), wherein when the hybrid vehicle reaches the charging station, the arrival rate calculating part is configured to update the probability corresponding to a driving position and a direction of advance of the hybrid vehicle based on a route of travel until the hybrid vehicle reaches the charging station.

(11) The control device of a hybrid vehicle described in any one of above (1) to (10), wherein the arrival rate calculating part is configured to calculate the probability for each state of a vehicle environment differing in at least one of hours, day of week, weather, driver, and number of passengers when the hybrid vehicle is being driven near the charging station.

(12) The control device of a hybrid vehicle described in above (11), wherein the arrival rate calculating part is configured to calculate the probability for each driver of the hybrid vehicle.

(13) The control device of a hybrid vehicle described in any one of above (1) to (10), wherein the arrival rate calculating part is configured to calculate the probability considering at least one of hours, day of week, weather, driver, and number of passengers when the hybrid vehicle is being driven near the charging station.

Advantageous Effects of Invention

According to the present invention, it is possible to shorten the operating time of the internal combustion engine while keeping down the drop in power performance of a hybrid vehicle.

BRIEF DESCRIPTION OF DRAWINGS

FIG. 14 is a flow chart showing a control routine of processing for correcting the arrival rate in a sixth embodiment of the present invention.

DESCRIPTION OF EMBODIMENTS

Figure 1:
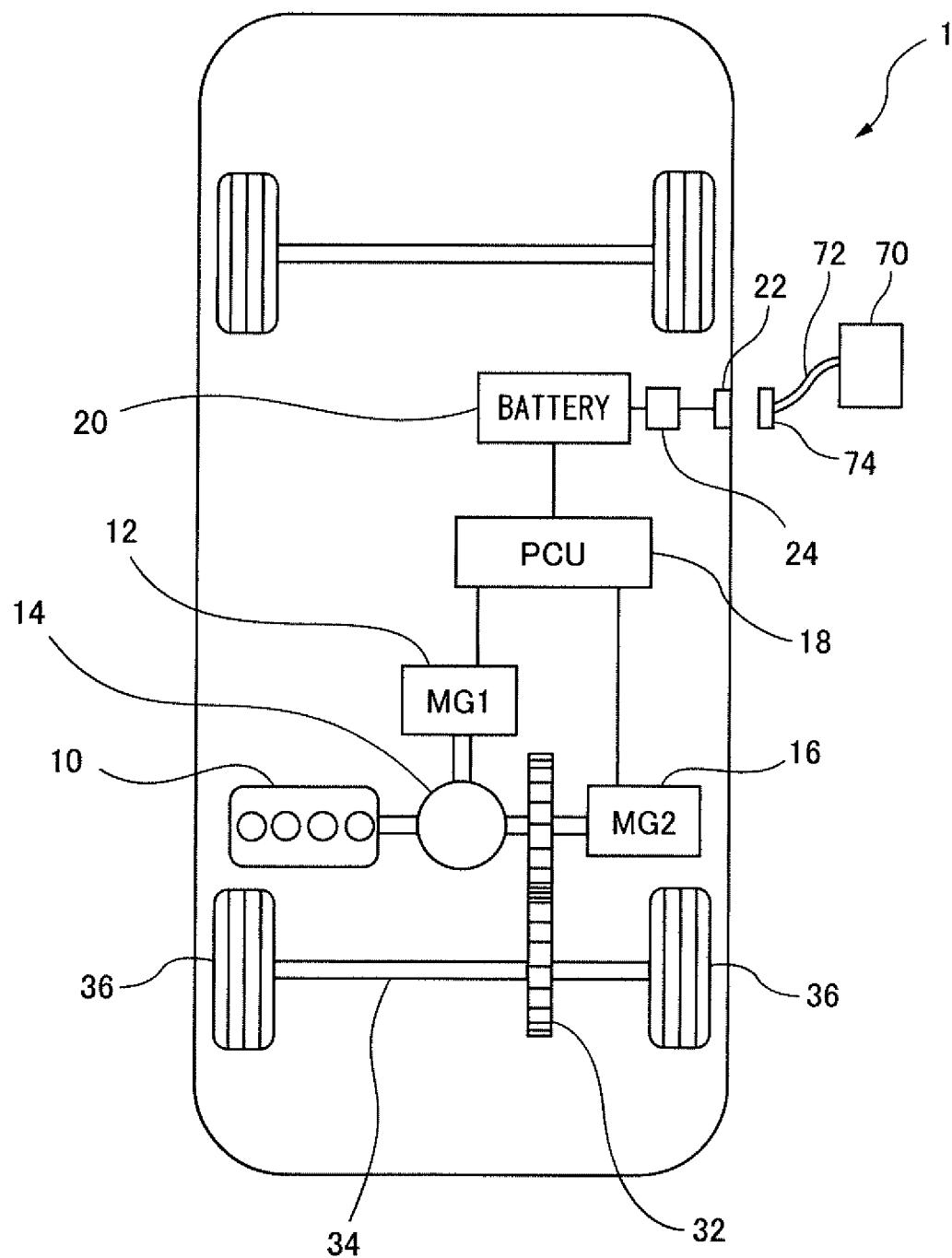
FIG. 1 is a view schematically showing the configuration of a hybrid vehicle according to a first embodiment of the present invention.

Below, referring to the drawings, embodiments of the present invention will be explained in detail. Note that, in the following explanation, similar components are assigned the same reference signs.

First Embodiment

Below, referring to FIG. 1 to FIG. 7, a first embodiment of the present invention will be explained.
<Configuration of Hybrid Vehicle>
FIG. 1 is a view schematically showing the configuration of a hybrid vehicle 1 according to the first embodiment of the present invention. A hybrid vehicle (below, simply referred to as a "vehicle") 1 is provided with an internal combustion engine 10, first motor-generator 12, power distributing mechanism 14, second motor-generator 16, power control unit (PCU) 18, and battery 20.

The internal combustion engine 10 burns an air-fuel mixture of fuel and air in cylinders to output power. The internal combustion engine 10, for example, is a gasoline engine or a diesel engine An output shaft of the internal combustion engine 10 (crankshaft) is mechanically connected to the power distributing mechanism 14, and output of the internal combustion engine 10 is input to the power distributing mechanism 14.

The first motor-generator 12 functions as a generator and motor. The first motor-generator 12 is mechanically connected to the power distributing mechanism 14, and the output of the first motor-generator 12 is input to the power distributing mechanism 14. Further, the first motor-generator 12 is electrically connected to the PCU 18. When the first motor-generator 12 functions as a generator, the electric power generated by the first motor-generator 12 is supplied through the PCU 18 to at least one of the second motor-generator 16 and battery 20. On the other hand, when the first motor-generator 12 functions as a motor, the electric power stored in the battery 20 is supplied through the PCU 18 to the first motor-generator 12.

The power distributing mechanism 14 is configured as a known planetary gear mechanism including a sun gear, ring gear, pinion gears, and a planetary carrier. The output shaft of the internal combustion engine 10 is coupled with the planetary carrier, the first motor-generator 12 is coupled with the sun gear, and a speed reducer 32 is coupled with the ring gear. The power distributing mechanism 14 distributes the output of the internal combustion engine 10 to the first motor-generator 12 and the speed reducer 32.

Specifically, when the first motor-generator 12 functions as a generator, the output of the internal combustion engine 10 input to the planetary carrier is distributed to the sun gear coupled with the first motor-generator 12 and the ring gear coupled with the speed reducer 32 in accordance with the gear ratio. The output of the internal combustion engine 10 distributed to the first motor-generator 12 is used to generate electric power by the first motor-generator 12. On the other hand, the output of the internal combustion engine 10 distributed to the speed reducer 32 is transmitted as power for driving use through an axle 34 to the wheels 36. Therefore, the internal combustion engine 10 can output power for driving use. Further, when the first motor-generator 12 functions as a motor, the output of the first motor-generator 12 is supplied through the sun gear and planetary carrier to the output shaft of the internal combustion engine 10 whereby the internal combustion engine 10 is cranked.

The second motor-generator 16 functions as a generator and motor. The second motor-generator 16 is mechanically connected to the speed reducer 32, and the output of the second motor-generator 16 is supplied to the speed reducer 32. The output of the second motor-generator 16 supplied to the speed reducer 32 is transmitted as power for driving use to the wheels 36 through the axle 34. Therefore, the second motor-generator 16 can output power for driving use.

Further, the second motor-generator 16 is electrically connected to the PCU 18. At the time of deceleration of the vehicle 1, due to rotation of the wheels 36, the second motor-generator 16 is driven and the second motor-generator 16 functions as a generator. As a result, so-called regeneration is performed. When the second motor-generator 16 functions as a generator, the regenerative power generated by the second motor-generator 16 is supplied through the PCU 18 to the battery 20. On the other hand, when the second motor-generator 16 functions as a motor, the power stored in the battery 20 is supplied through the PCU 18 to the second motor-generator 16.

The PCU 18 is electrically connected to the first motor-generator 12, second motor-generator 16, and battery 20. The PCU 18 includes an inverter, a booster converter, and a DC-DC converter. The inverter converts DC power supplied from the battery 20 to AC power and converts AC power generated by the first motor-generator 12 or second motor-generator 16 to DC power. The booster converter boosts the voltage of the battery 20 in accordance with need when the power stored in the battery 20 is supplied to the first motor-generator 12 or the second motor-generator 16. The DC-DC converter lowers the voltage of the battery 20 when the electric power stored in the battery 20 is supplied to the headlights or other electronic equipment.

The power generated by the first motor generator 12 using the output of the internal combustion engine 10 and the regenerative power generated by the second motor generator 16 using regenerated energy are supplied to the battery 20. Therefore, the battery 20 can be charged by the output of the internal combustion engine 10 and the regenerated energy. The battery 20, for example, is a lithium ion battery, nickel hydrogen battery, or other secondary battery.

The vehicle 1 is further provided with a charging port 22 and charger 24. The battery 20 can be charged by an external power source 70 as well. Therefore, the vehicle 1 is a so-called "plug-in hybrid vehicle".

The charging port 22 is configured so as to receive the electric power from the external power source 70 through a charging connector 74 of a charging cable 72. When the battery 20 is charged by the external power source 70, the charging connector 74 is connected to the charging port 22. The charger 24 converts the electric power supplied from the external power source 70 to electric power which can be supplied to the battery 20. Note that, the charging port 22 may also be connected to the PCU 18, and the PCU 18 may also function as the charger 24.

<Control Device of Hybrid Vehicle>

Figure 2:
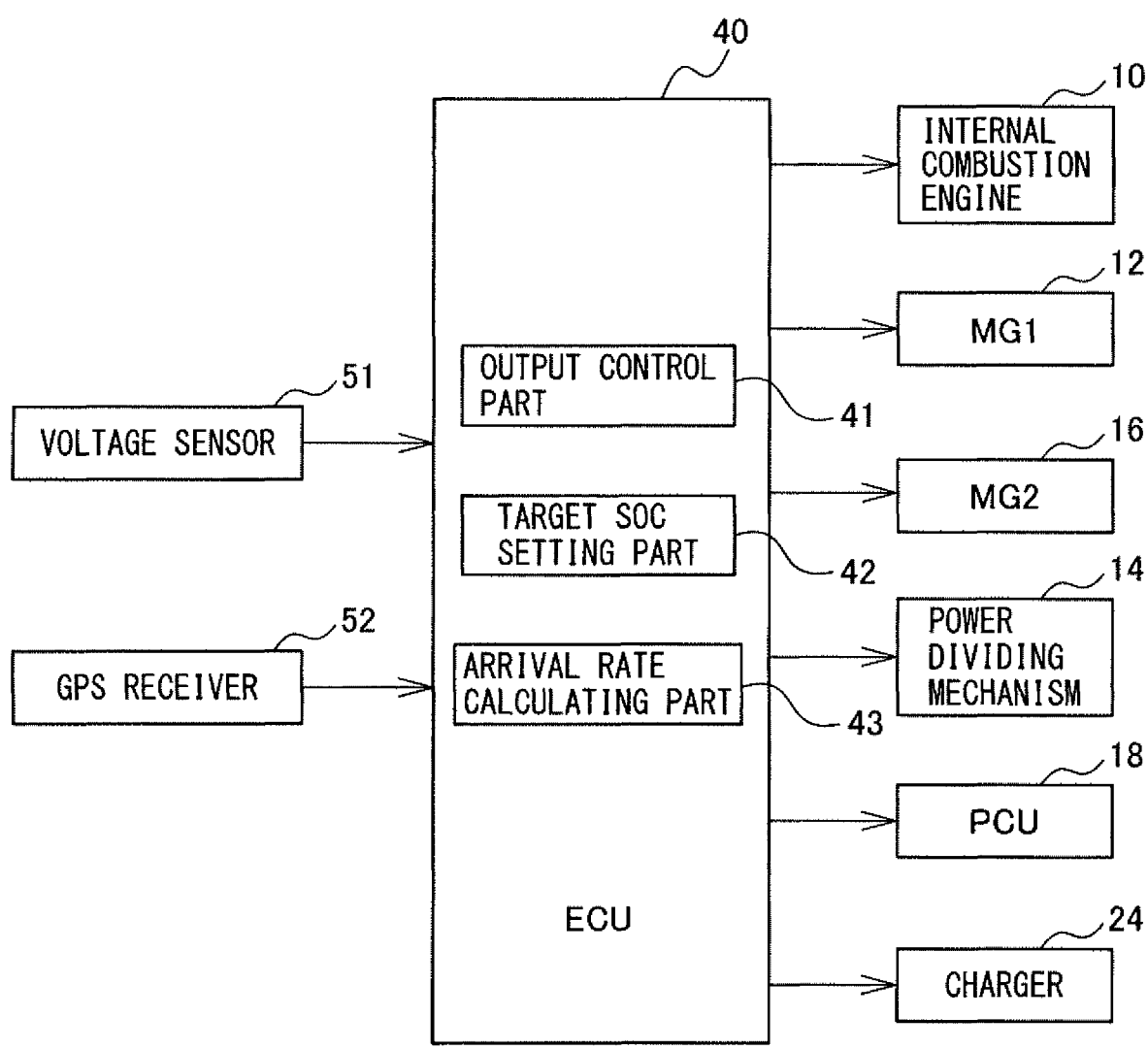
FIG. 2 is a block diagram schematically showing the configuration of a control device of a hybrid vehicle etc., according to the first embodiment of the present invention.

FIG. 2 is a block diagram schematically showing the configuration of the control device of a hybrid vehicle etc., according to the first embodiment of the present invention. The vehicle 1 is provided with an electronic control unit (ECU) 40. The ECU 40 is an electronic control device for controlling the vehicle 1. The ECU 40 comprises a memory such as a read only memory (ROM) and random access memory (RAM), a central processing unit (CPU), an input port, an output port, a communication module, etc. In the present embodiment, a single ECU 40 is provided, but a plurality of ECUs may be provided for the different functions.

The ECU 40 receives input of outputs of various sensors provided at the vehicle 1. For example, in the present embodiment, the outputs of the voltage sensor 51 and GPS receiver 52 are input to the ECU 40.

The voltage sensor 51 is attached to the battery 20 and detects the voltage across electrodes of the battery 20. The voltage sensor 51 is connected to the ECU 40, and the output of the voltage sensor 51 is sent to the ECU 40.

The GPS receiver 52 receives signals from three or more GPS satellites and detects a current position of the vehicle 1 (for example, a longitude and latitude of the vehicle 1). The GPS receiver 52 is connected to the ECU 40. The output of the GPS receiver 52 is transmitted to the ECU 40.

The ECU 40 is connected to the internal combustion engine 10, first motor generator 12, second motor generator 16, power dividing mechanism 14, PCU 18 and charger 24, and controls the same. In the present embodiment, the ECU 40 runs programs stored in the memory etc., to thereby function as an output control part 41, a target SOC setting part 42, and an arrival rate calculating part 43.

The output control part 41 controls the outputs of the internal combustion engine 10, first motor generator 12, and second motor generator 16. Specifically, the output control part 41 switches the driving mode of the vehicle 1 between the EV mode and HV mode and controls the outputs of the internal combustion engine 10, first motor generator 12, and second motor generator 16 in the EV mode and HV mode. The EV mode is a driving mode with a relatively small ratio of operating time of the internal combustion engine with respect to the operating time of the vehicle 1 (the time when ignition switch is turned on), while the HV mode is a driving mode with a relatively large ratio of the same.

The vehicle 1 roughly has three drive states. In the first drive state, the internal combustion engine 10 is stopped and drive-use power is output by only the second motor generator 16. In the first drive state, the battery 20 is not charged by the output of the internal combustion engine 10 while electric power is supplied from the battery 20 to the second motor generator 16. Note that, if a one-way clutch transmitting rotational force only in one direction is provided at the power dividing mechanism 14, it is possible to output drive-use power by both the first motor generator 12 and second motor generator 16. In this case, in the first drive state, the internal combustion engine 10 is stopped and drive-use power is output by the second motor generator 16 or by the first motor generator 12 and second motor generator 16.

In the second drive state, the internal combustion engine 10 is operated and the output of the internal combustion engine 10 is used to charge the battery 20. In the second drive state, drive-use power is output by the internal combustion engine 10 and the electric power generated using a part of the output of the internal combustion engine 10 is supplied to the battery 20. Note that, in the second drive state, electric power may be supplied to the second motor generator 16 and the second motor generator 16 may output drive-use power.

In the third drive state, the internal combustion engine 10 is operated and the output of the internal combustion engine 10 is not used to charge the battery 20. In the third drive state, electric power generated using part of the output of the internal combustion engine 10 is supplied to the second motor generator 16. The drive-use power is output by the internal combustion engine 10 and second motor generator 16. Note that, in the third drive state, electric power may be supplied from the battery 20 to the second motor generator 16.

In the EV mode, the drive state of the vehicle 1 is continuously maintained at the first drive state. That is, in the EV mode, the internal combustion engine 10 is continuously stopped. On the other hand, in the HV mode, the drive state of the vehicle 1 is switched to the first drive state, second drive state, and third drive state in accordance with the vehicle speed, state of charge (SOC) of the battery 20, driver demanded output, and other conditions. Therefore, the EV mode is a driving mode with a relatively large ratio of reduction of the SOC of the battery 20, while the HV mode is a driving mode with a relatively small ratio of reduction of the SOC of the battery 20.

The target SOC setting part 42 sets a target SOC which is a target value of the SOC of the battery 20 when the vehicle 1 reaches a predetermined charging station. The output control part 41 controls the outputs of the internal combustion engine 10, first motor generator 12, and second motor generator 16 when the vehicle 1 is being driven outside a charging station so that the SOC of the battery 20 when the vehicle 1 reaches the charging station becomes the target SOC.

Specifically, the output control part 41 calculates the switching SOC based on the target SOC, sets the driving mode of the vehicle 1 to the EV mode when the current SOC is equal to or more than the switching SOC, and sets the driving mode of the vehicle 1 to the HV mode when the current SOC is less than the switching SOC. The switching SOC is set so that the driving mode from the current location of the vehicle 1 to a charging station is maintained at the EV mode. By doing this, the operating time of the internal combustion engine 10 can be shortened.

When driving the vehicle 1 by only the EV mode from the current location up to a charging station, the longer the distance from the current location to the charging station, the greater the amount of electric power required until reaching the charging station. For this reason, the output control part 41 calculates the amount of electric power required for making the vehicle 1 reach the charging station by the EV mode and calculates the switching SOC by adding the SOC corresponding to the amount of electric power required to the target SOC.

Figure 3:
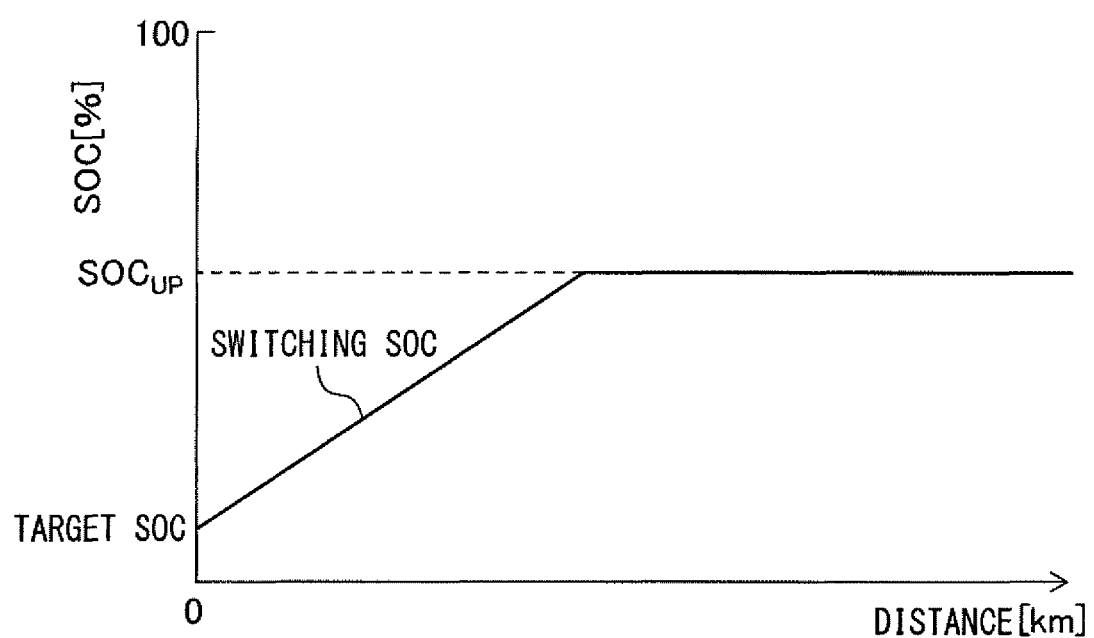
FIG. 3 is a view schematically showing a relationship of a distance to a charging station and a switching SOC.

FIG. 3 is a view schematically showing the relationship of the distance up to a charging station and the switching SOC. As shown in FIG. 3, the switching SOC is set to the target SOC when the distance up to the charging station is zero and is made higher the longer the distance up to the charging station. However, if the SOC becomes too high, the regenerative electric power obtained by a long downward slope etc., cannot be used to charge the battery 20 and the regenerative electric power becomes wasted. For this reason, an upper limit value SOCup is set for the switching SOC.

As explained above, in the vehicle 1, an external power source 70 can be used to charge the battery 20. In this case, when the vehicle 1 reaches a charging station where an external power source 70 is provided, the SOC of the battery 20 is preferably as low as possible. By doing this, the operating time of the internal combustion engine 10 can be kept to the minimum and in turn the fuel efficiency and exhaust emission of the vehicle 1 can be improved. Further, if the battery 20 is charged by the external power source 70 at the charging station, the SOC of the battery 20 is restored. For this reason, when the vehicle 1 is again driven, the driving mode can be set to the EV mode.

Therefore, preferably the target SOC is set to as low a value as possible. However, the driver of the vehicle 1 changes the destination during driving as the occasion demands. For this reason, even if the vehicle 1 is being driven near a charging station, sometimes the hybrid vehicle will not stop at the charging station.

If the vehicle 1 passes the charging station when the target SOC for a charging station is set to substantially zero, the vehicle 1 cannot use almost any electric power of the battery 20 until the next charging. In this case, it is not possible to use the first motor generator 12 and second motor generator 16 as the drive-use power source or it is necessary to limit the outputs of the first motor generator 12 and second motor generator 16. As a result, the power performance of the vehicle 1 falls.

For this reason, when a probability of the vehicle 1 reaching a charging station (below, referred to as an "arrival rate") is low, it is preferable to make the target SOC higher by a certain extent. Therefore, in the present embodiment, the target SOC setting part 42 lowers the target SOC when the arrival rate is relatively high compared to when the arrival rate is relatively low.

By doing this, even when the vehicle 1 passes a charging station with a low arrival rate (for example, a shopping mall etc., other than the home), the target SOC will be high, so it will be possible to secure the power performance of the vehicle 1 by the remaining SOC. Further, for a charging station with a high arrival rate (for example, the home), the target SOC can be set low and the driving time of the vehicle 1 by the EV mode can be lengthened. Therefore, in the present embodiment, it is possible to shorten the operating time of the internal combustion engine 10 while keeping the power performance of the vehicle 1 from dropping.

In the present embodiment, the arrival rate is calculated by the arrival rate calculating part 43. The arrival rate changes in accordance with the behavior pattern of the driver of the vehicle 1. For this reason, the arrival rate calculating part 43 raises the arrival rate the higher the frequency at which the vehicle 1 stops at a charging station when being driven near the charging station. Specifically, the arrival rate calculating part 43 raises the arrival rate if the vehicle 1 stops at a charging station when being driven near the charging station, and lowers the arrival rate when the vehicle 1 does not stop at a charging station when being driven near the charging station.

The driver of the vehicle 1 often utilizes a plurality of charging stations for charging the battery 20 (home, parking lot provided with external power source 70, charging stand, etc.). If there are a plurality of charging stations, the arrival rate and target SOC are calculated for each charging station. The calculated arrival rates and target SOCs are stored in the memory of the ECU 40.

Further, the charging stations utilized by the vehicle 1 are successively registered in accordance with the states of utilization of the external power sources 70 of the charging stations. For example, if the battery 20 is charged by an external power source 70 at a predetermined location for the first time, that position is registered as a charging station. The position information is detected by the GPS receiver 52.

It is judged whether or not the battery 20 has been charged based on the SOC of the battery 20. For example, if the SOC rises when the internal combustion engine 10 is stopped, it is judged that the battery 20 has been charged. Note that, whether or not the battery 20 has been charged may be judged by detecting the connection of a charging connector 74 to a charging port 22 by a sensor etc.

Further, if the vehicle 1 is provided with a navigation system, a charging station may be registered in the map data of the navigation system. In this case, a charging station may be registered by the driver himself. Further, charging stations present in the map data and within a predetermined distance from the home may be registered in advance as charging stations utilized by the driver. The registered information of the charging stations is stored in the ECU 40.

<Processing for Calculating Arrival Rate>

Figure 4:
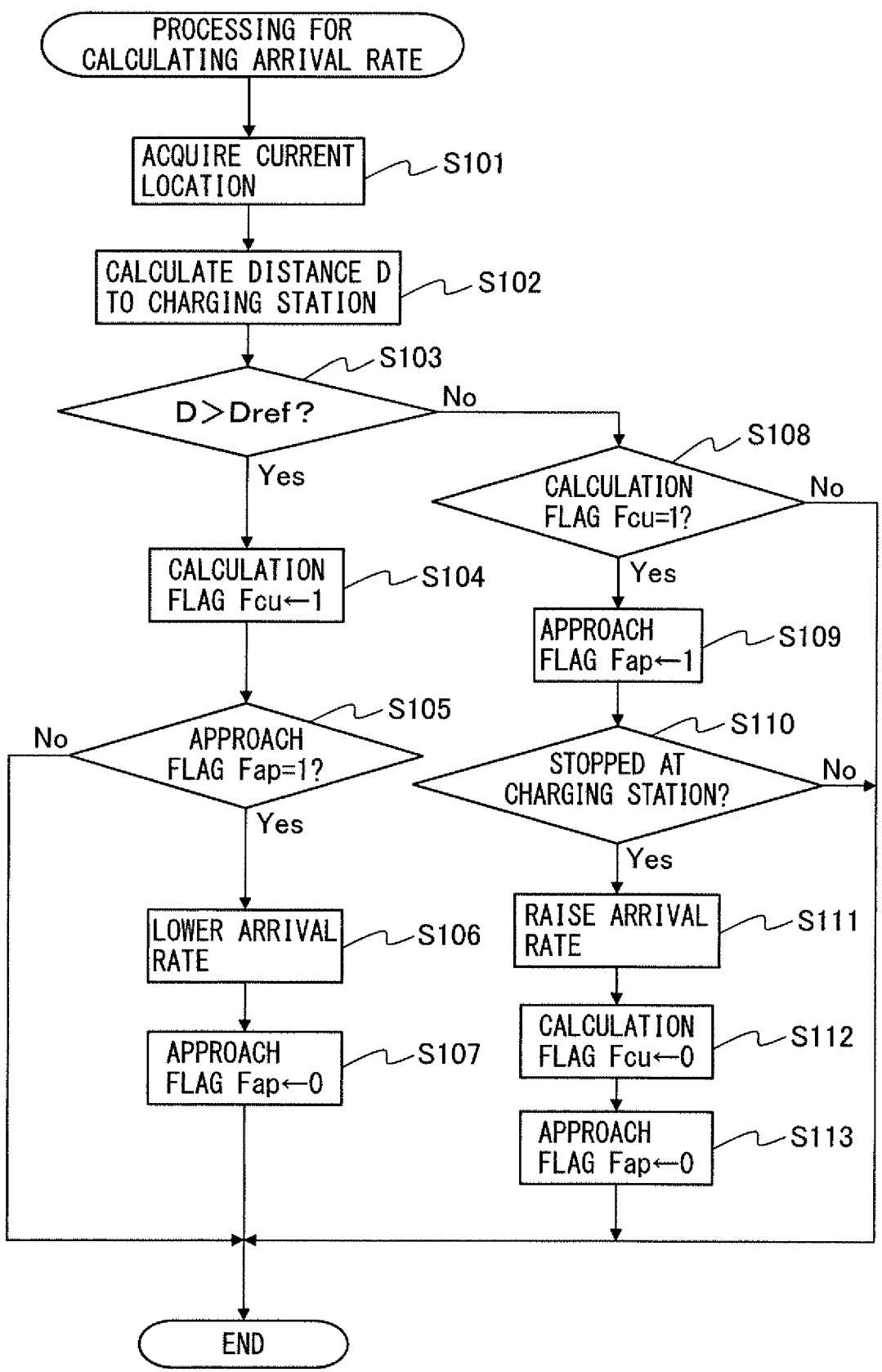
FIG. 4 is a flow chart showing a control routine of processing for calculating an arrival rate in the first embodiment of the present invention.

FIG. 4 is a flow chart showing a control routine of processing for calculating an arrival rate in the first embodiment of the present invention. In the present control routine, the arrival rate is calculated. The present control routine is performed for each registered charging station and is repeatedly executed by the ECU 40 at predetermined time intervals.

First, at step S101, the arrival rate calculating part 43 acquires the current location of the vehicle 1. The current location of the vehicle 1 is detected by the GPS receiver 52. Next, at step S102, the arrival rate calculating part 43 calculates the distance D from the current location to the charging station.

Next, at step S103, the arrival rate calculating part 43 judges whether the distance D is longer than a reference distance Dref. The reference distance Dref is predetermined and is for example 100 m to 2 km. If at step S103 it is judged that the distance D is longer than the reference distance Dref, the present control routine proceeds to step S104.

At step S104, the arrival rate calculating part 43 sets a calculation flag Fcu to "1". The arrival rate is updated only when the calculation flag Fcu is set to "1". Next, at step S105, the arrival rate calculating part 43 judges whether the approach flag Fap is "1". If it is judged that the approach flag Fap is zero, the present control routine is ended.

On the other hand, if it is judged at step S103 that the distance D is equal to or less than the reference distance Dref, that is, if it is judged that the vehicle 1 is being driven near the charging station, the present control routine proceeds to step S108. At step S108, the arrival rate calculating part 43 judges whether the calculation flag Fcu is "1". If it is judged that the calculation flag Fcu is zero, the present control routine is ended. On the other hand, if it is judged that the calculation flag Fcu is "1", the present control routine proceeds to step S109.

At step S109, the arrival rate calculating part 43 sets the approach flag Fap to "1". Next, at step S110, the arrival rate calculating part 43 judges whether the vehicle 1 has stopped at the charging station. For example, the arrival rate calculating part 43 judges that the vehicle 1 has stopped at the charging station if the ignition switch of the vehicle 1 is turned off at the charging station. Note that, the arrival rate calculating part 43 may judge that the vehicle 1 has stopped at the charging station when the speed of the vehicle 1 becomes zero at the charging station. The speed of the vehicle 1 is detected by the vehicle speed sensor etc., provided at the vehicle 1.

If at step S110 it is judged that the vehicle 1 has not stopped at the charging station, the present control routine is ended. On the other hand, if it is judged that the vehicle 1 has stopped at the charging station, the present control routine proceeds to step S111. In this case, the vehicle 1 has reached the charging station, so at step S111, the arrival rate calculating part 43 raises the arrival rate by exactly a predetermined value. The arrival rate after updating is stored in the memory of the ECU 40.

Next, at step S112, the arrival rate calculating part 43 resets the calculation flag Fcu to zero. Next, at step S113, the arrival rate calculating part 43 resets the approach flag Fap to zero. After step S113, the present control routine is ended.

Further, if at step S105 it is judged that the approach flag Fap is "1", the present control routine proceeds to step S106. In this case, the vehicle 1 approaches the charging station, then moves away from the charging station without stopping at the charging station. For this reason, it is judged that the vehicle 1 has passed the charging station. At step S106, the arrival rate calculating part 43 lowers the arrival rate by exactly a predetermined value. After updating, the arrival rate is stored in the memory of the ECU 40.

Next, at step S107, the arrival rate calculating part 43 resets the approach flag Fap to zero. After step S107, the present control routine is ended.

Note that, in the present control routine, whether the vehicle 1 is being driven near the charging station is judged based on the distance D to the charging station. However, this judgment may be performed based on the SOC required for reaching the charging station by the EV mode. In this case, at step S103, the arrival rate calculating part 43 judges whether the required SOC is higher than the predetermined reference SOC. If it is judged that the required SOC is equal to or less than the reference SOC, it is judged that the vehicle 1 is being driven near the charging station. The required SOC is calculated based on the distance D to the charging station, the gradient information and the driving history (average vehicle speed etc.) of the route up to the charging station, current vehicle speed, etc.

Further, the arrival rate calculating part 43 may judge whether the vehicle 1 is being driven near the charging station based on the driving time to the charging station. In this case, at step S103, the arrival rate calculating part 43 judges whether the driving time to the charging station is higher than a predetermined reference time. If it is judged that the driving time to the charging station is equal to or less than the reference time, it is judged that the vehicle 1 is being driven near the charging station. The driving time to the charging station is calculated based on the distance D to the charging station, the driving history of the route to the charging station (required time etc.), the current vehicle speed, etc.

Further, either of step S106 and step Sill may be omitted. That is, when updating the arrival rate, the arrival rate may be just increased or just decreased. Further, the arrival rate may be lowered only when the vehicle 1 passes in front of a charging station without stopping at the charging station.

<Processing for Calculating Target SOC>

Figure 5:
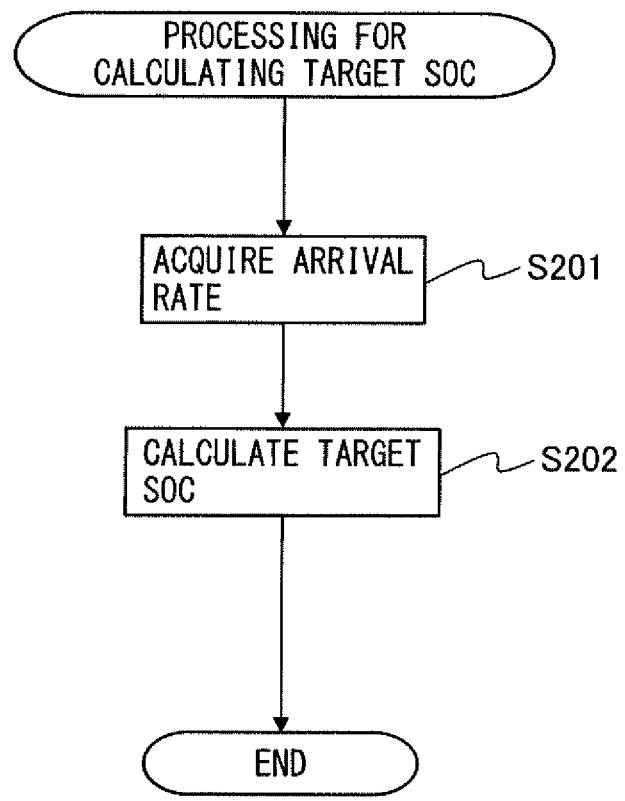
FIG. 5 is a flow chart showing a control routine of processing for calculating a target SOC in the first embodiment of the present invention.
Figure 6:
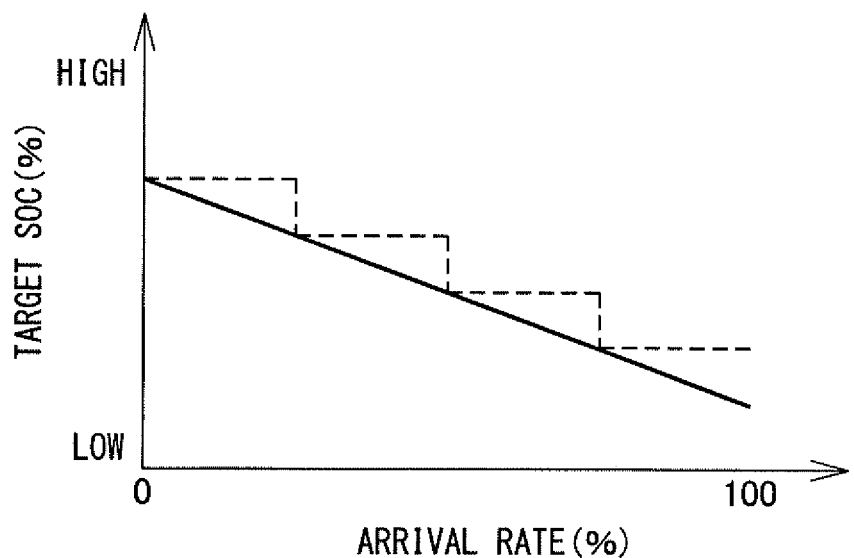
FIG. 6 is a graph showing a relationship of an arrival rate and a target SOC.

FIG. 5 is a flow chart showing a control routine of processing for calculating the target SOC in the first embodiment of the present invention. In the present control routine, the target SOC is calculated. The present control routine is performed for each registered charging station, is repeatedly performed by the ECU 40 at predetermined time intervals, or is performed at the timing of updating the arrival rate.

First, at step S201, the target SOC setting part 42 acquires the arrival rate. Next, at step S202, the target SOC setting part 42 calculates the target SOC based on the arrival rate.

Specifically, the target SOC setting part 42 lowers the target SOC when the arrival rate is relatively high compared to when the arrival rate is relatively low. The target SOC setting part 42, as shown by the solid line in FIG. 6, linearly lowers the target SOC as the arrival rate becomes higher. Note that, the target SOC setting part 42, as shown by the broken line in FIG. 6, may lower the target SOC in stages (in steps) as the arrival rate becomes higher. After step S202, the present control routine is ended.

<Processing for Setting Driving Mode>

Figure 7:
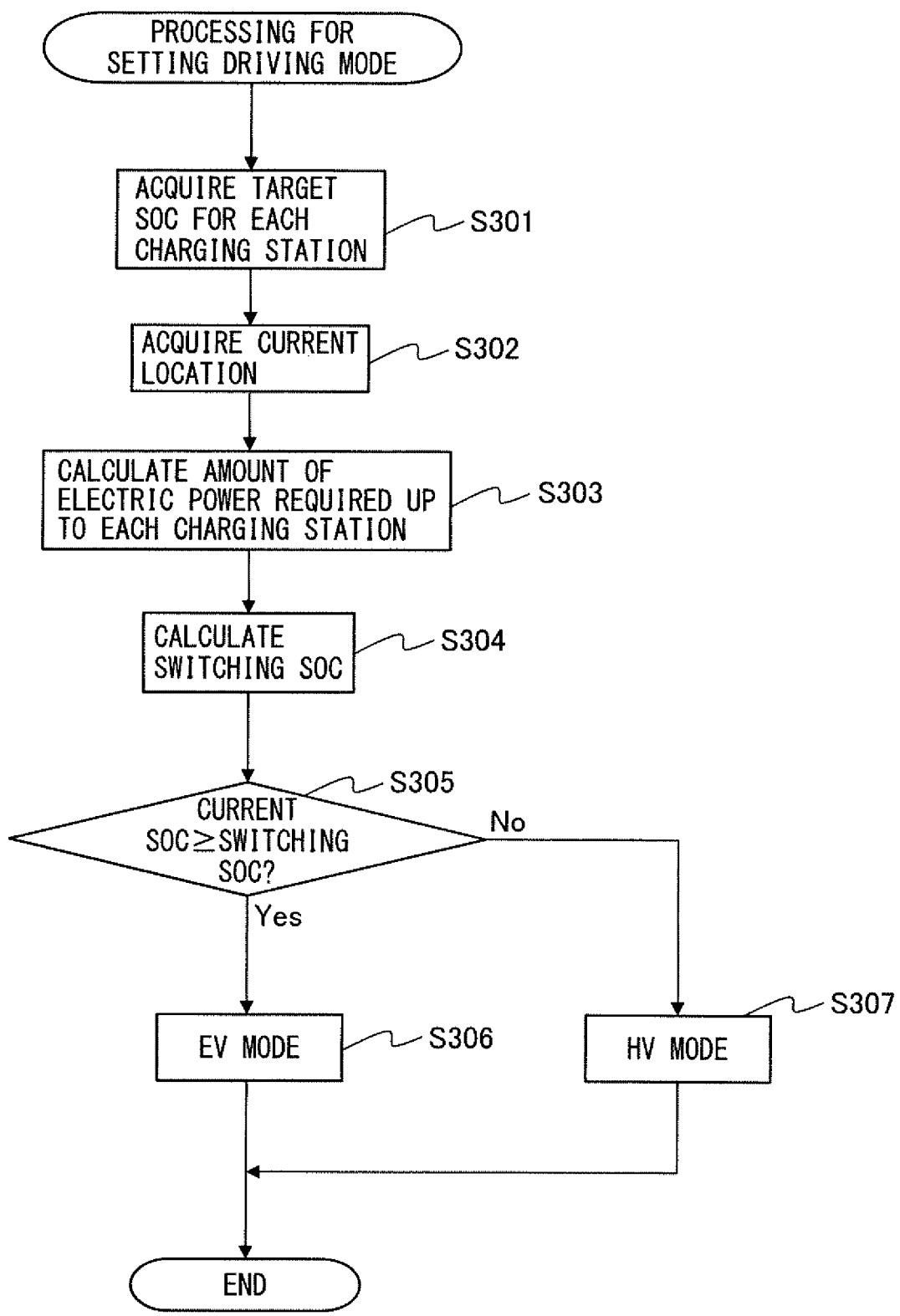
FIG. 7 is a flow chart showing a control routine of processing for setting a driving mode in the first embodiment of the present invention.

FIG. 7 is a flow chart showing the control routine of processing for setting the driving mode in the first embodiment of the present invention. In the present control routine, the driving mode of the vehicle 1 is set. The present control routine is performed repeatedly by the ECU 40 at predetermined time intervals.

First, at step S301, the output control part 41 acquires the target SOC for each charging station. Note that, if a charging station is input as a destination in a navigation system, the possibility of vehicle 1 arriving at the charging station is high, so the output control part 41 may lower the target SOC for that charging station by exactly a predetermined value. Next, at step S302, the output control part 41 acquires the current location of the vehicle 1. The current location is detected by the GPS receiver 52.

Next, at step S303, the output control part 41 calculates the amount of electric power required for the vehicle 1 to reach each charging station from the current location by the EV mode. The required amount of electric power is calculated based on the distance from the current location to the charging station, the gradient information and driving history (average vehicle speed etc.) of the route up to the charging station, the current vehicle speed, etc.

Next, at step S304, the output control part 41 calculates the switching SOC. Specifically, the output control part 41 calculates the switching SOC for each charging station and sets the minimum value of the switching SOC to the final switching SOC. The switching SOC for each charging station is calculated by adding the SOC corresponding to the amount of electric power required calculated at step S303 to the target SOC. Note that, if a predetermined charging station is input as the destination in the navigation system, the switching SOC for only that charging station may be calculated.

Next, at step S305, the output control part 41 judges whether the current SOC is equal to or more than the switching SOC. The current SOC is calculated based on the output of the voltage sensor 51 etc.

If at step S305 it is judged that the current SOC is equal to or more than the switching SOC, the present control routine proceeds to step S306. At step S306, the output control part 41 sets the driving mode of the vehicle 1 to the EV mode. After step S306, the present control routine is ended.

On the other hand, if at step S305 it is judged that the current SOC is less than the switching SOC, the present control routine proceeds to step S307. At step S307, the output control part 41 sets the driving mode of the vehicle 1 to the HV mode. After step S307, the present control routine is ended.

Second Embodiment

The control device of a hybrid vehicle according to a second embodiment is basically similar in configuration and control to the control device of a hybrid vehicle according to the first embodiment except for the points explained below. For this reason, below, the second embodiment of the present invention will be explained focusing on parts different from the first embodiment.

Even if the vehicle 1 is stopped at a charging station, sometimes the driver does not charge the battery 20 by the external power source 70. For example, if the stopped time is short, often the battery 20 is not charged. If the arrival rate at a charging station where the battery 20 is hardly charged when the vehicle 1 stops is made higher, the target SOC for that charging station is also set low. lithe battery 20 is not charged at this charging station, the vehicle 1 departs from the charging station in the state of a low SOC. As a result, the power performance of the vehicle 1 falls.

For this reason, in the second embodiment, the arrival rate calculating part 43 raises the arrival rate the higher the frequency at which the battery 20 has been charged by the external power source 70 at the charging station when the vehicle 1 is being driven near the charging station. As a result, since the arrival rate is calculated while considering whether charging has been performed at the charging station, it is possible to set the target SOC to a more suitable value and possible to further keep the power performance of the vehicle 1 from dropping.

Specifically, the arrival rate calculating part 43 raises the arrival rate if the battery 20 is charged by an external power source 70 at a charging station when the vehicle 1 is being driven near the charging station, and lowers the arrival rate if the battery 20 is not charged by an external power source 70 at a charging station when the vehicle 1 is being driven near the charging station.

<Processing for Calculating Arrival Rate>

Figure 8:
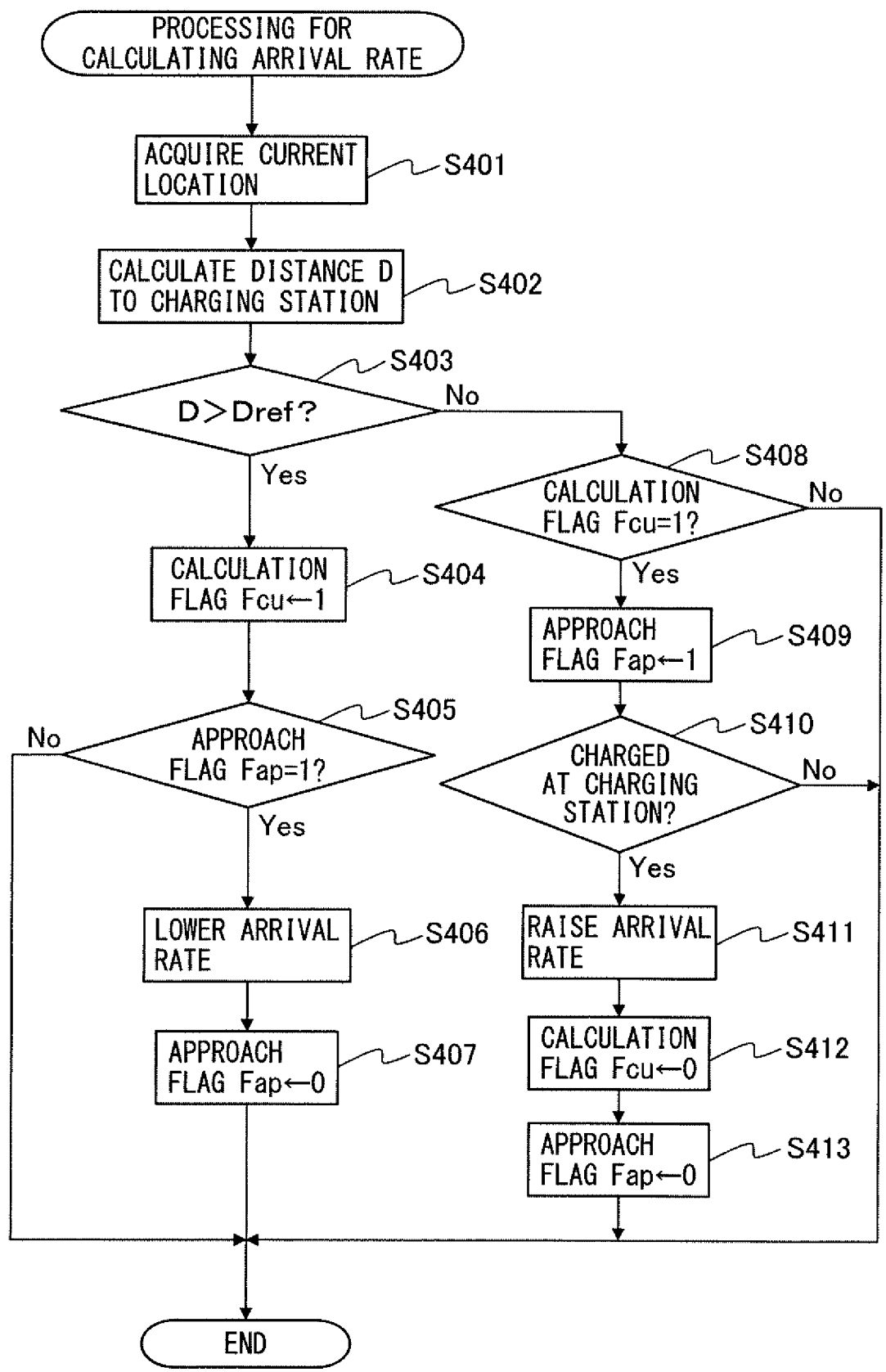
FIG. 8 is a flow chart showing a control routine of processing for calculating an arrival rate in a second embodiment of the present invention.

FIG. 8 is a flow chart showing a control routine of processing for calculating an arrival rate in the second embodiment of the present invention. In the present control routine, the arrival rate is calculated. The present control routine is performed for each registered charging station and is repeatedly executed by the ECU 40 at predetermined time intervals.

Step S401 to step S409 are similar to step S101 to step S109 of FIG. 4, so explanations will be omitted. In the present control routine, after step S409, at step S410, the arrival rate calculating part 43 judges whether the battery 20 has been charged at the charging station.

The arrival rate calculating part 43 judges whether the battery 20 has been charged based on the SOC of the battery 20. For example, the arrival rate calculating part 43 judges that the battery 20 has been charged at the charging station if the SOC when the vehicle 1 departs from the charging station is higher than the SOC when the vehicle 1 is stopped at the charging station. Note that, whether or not the battery 20 has been charged may be judged by detecting the connection of a charging connector 74 to a charging port 22 by a sensor etc.

If at step S410 it is judged that the battery 20 has not been charged at the charging station, the present control routine is ended. On the other hand, if at step S410 it is judged that the battery 20 has been charged at the charging station, the present control routine proceeds to step S411. At step S411, the arrival rate calculating part 43 increases the arrival rate by exactly a predetermined value.

After step S411, the arrival rate calculating part 43 resets the calculation flag Fcu to zero at step S412 and resets the approach flag Fap to zero at step S413. After step S413, the present control routine is ended. Note that, the present control routine can be modified in the same way as the control routine of FIG. 4.

Note that, in the second embodiment as well, in the same way as the first embodiment, the control routine of processing for calculating the target SOC of FIG. 5 and control routine of processing for setting the driving mode of FIG. 7 are performed.

Third Embodiment

The control device of a hybrid vehicle according to a third embodiment is basically similar in configuration and control to the control device of a hybrid vehicle according to the first embodiment except for the points explained below. For this reason, below, the third embodiment of the present invention will be explained focusing on parts different from the first embodiment.

Even if the outputs of the internal combustion engine 10, first motor generator 12, and second motor generator 16 are controlled so that the SOC of the battery 20 becomes the target SOC when the vehicle 1 reaches a charging station, sometimes the SOC becomes sufficiently high near the charging station. For example, if there is a long downward slope on the route up to the charging station, the SOC will tend to become higher near the charging station.

When the SOC is sufficiently high near the charging station, even if the vehicle 1 passes the charging station, the vehicle 1 can be driven by the EV mode. For this reason, when the SOC is sufficiently high near the charging station, there is little motivation for the driver to stop the vehicle 1 at the charging station. Further, if the vehicle 1 passes the charging station when the SOC is sufficiently high near the charging station, if the arrival rate is made lower, the arrival rate is excessively made lower and in turn the target SOC is excessively made higher. As a result, the operating time of the internal combustion engine becomes longer and the fuel efficiency and exhaust emission of the vehicle 1 deteriorate.

For this reason, in the third embodiment, the arrival rate calculating part 43 does not lower the arrival rate if the SOC of the battery 20 is equal to or more than a predetermined value even if the vehicle 1 does not stop at the charging station when being driven near the charging station. By doing this, it is possible to keep the arrival rate from becoming excessively lower and in turn possible to keep the target SOC from becoming excessively high.

<Processing for Calculating Arrival Rate>

Figure 9:
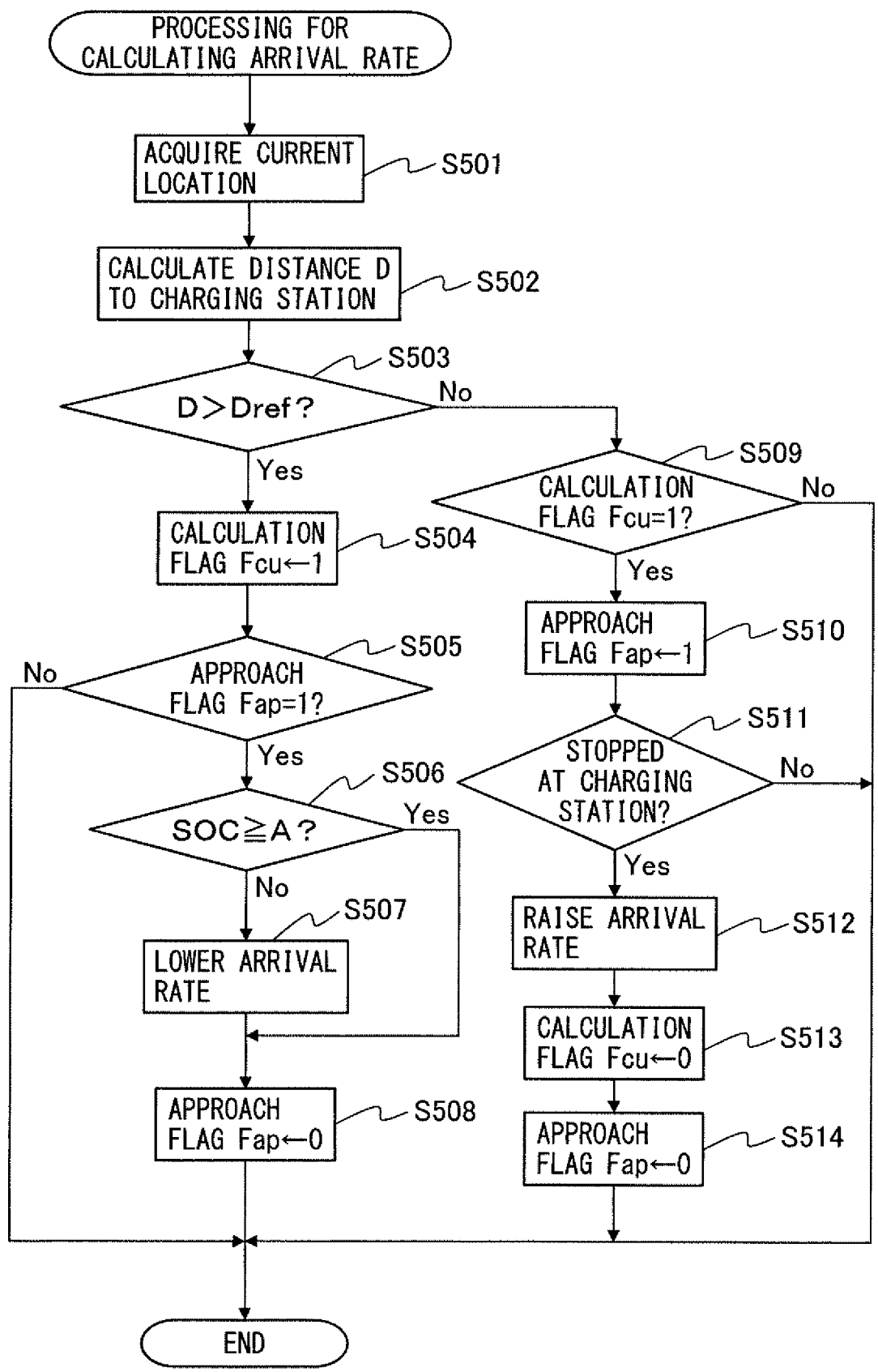
FIG. 9 is a flow chart showing a control routine of processing for calculating an arrival rate in a third embodiment of the present invention.

FIG. 9 is a flow chart showing a control routine of processing for calculating an arrival rate in the third embodiment of the present invention. In the present control routine, the arrival rate is calculated. The present control routine is performed for each registered charging station and is repeatedly executed by the ECU 40 at predetermined time intervals.

Step S501 to step S505 and step S509 to step S514 are similar to step S101 to step S105 and step S108 to step S113 of FIG. 4, so explanations will be omitted. If at step S505 it is judged that the approach flag Fap is "1", the present control routine proceeds to step S506.

At step S506, the arrival rate calculating part 43 judges whether the current SOC is equal to or more than a predetermined value A. The current SOC is calculated based on the output of the voltage sensor 51 etc. The predetermined value A is set in advance and is set to a value higher than the upper limit value of the target SOC (target SOC corresponding to the arrival rate 0%).

If at step S506 it is judged that current SOC is less than the predetermined value A, the present control routine proceeds to step S507. At step S507, the arrival rate calculating part 43 lowers the arrival rate by exactly a predetermined value. On the other hand, when at step S506 it is judged that the current SOC is equal to or more than the predetermined value A, the present control routine skips step S507 and proceeds to step S508. At step S508, the arrival rate calculating part 43 resets the approach flag Fap to zero. After step S508, the present control routine is ended.

Note that, the present control routine can be modified in the same way as the control routine of FIG. 4. Further, step S506 can be added between step S511 and step S512. In this case, if at step S506 it is judged that the current SOC is less than the predetermined value A, the present control routine proceeds to step S512 where the arrival rate is made higher by exactly a predetermined value. On the other hand, if at step S506 it is judged that the current SOC is equal to or more than the predetermined value A, the present control routine skips step S512 and proceeds to step S513. That is, the arrival rate calculating part 43 need not raise the arrival rate if the SOC of the battery 20 is equal to or more than the predetermined value A even if the vehicle 1 stops at the charging station when being driven near the charging station. By doing this, it is possible to keep the arrival rate from becoming excessively higher and in turn possible to keep the target SOC from becoming excessively lower.

Note that, in the third embodiment as well, in the same way as the first embodiment, the control routine of processing for calculating the target SOC of FIG. 5 and control routine of processing for setting the driving mode of FIG. 7 are performed.

Fourth Embodiment

The control device of a hybrid vehicle according to a fourth embodiment is basically similar in configuration and control to the control device of a hybrid vehicle according to the first embodiment except for the points explained below. For this reason, below, the fourth embodiment of the present invention will be explained focusing on parts different from the first embodiment.

The arrival rate at each charging station often changes according to the driving position of the vehicle 1. For example, at the driving position after the vehicle 1 advances through an intersection X, the arrival rate at the first charging station sometimes becomes higher, while at the driving position after the vehicle 1 turns right at the intersection X, the arrival rate at the second charging station sometimes becomes higher. Further, even when the driving position is the same, the arrival rate at each charging station will change in accordance with the direction of advance of the vehicle 1. Typically, in a direction of advance approaching a charging station, the arrival rate will become higher, while in a direction of advance separating from a charging station, the arrival rate will become lower.

Therefore, in the fourth embodiment, the arrival rate calculating part 43 calculates the arrival rate corresponding to the driving position and the direction of advance of the vehicle 1 based on the route of travel until the vehicle 1 reaches the charging station. Specifically, when the vehicle 1 reaches the charging station, the arrival rate calculating part 43 updates the arrival rate corresponding to the driving position and the direction of advance of the vehicle 1 based on the route of travel until the vehicle 1 reaches the charging station. By doing this, it is possible to raise the precision of the arrival rate at the charging station. Therefore, it is possible to set the target SOC to a more suitable value and possible to better keep the power performance of the vehicle 1 from falling.

<Processing for Calculating Arrival Rate>

Figure 10:
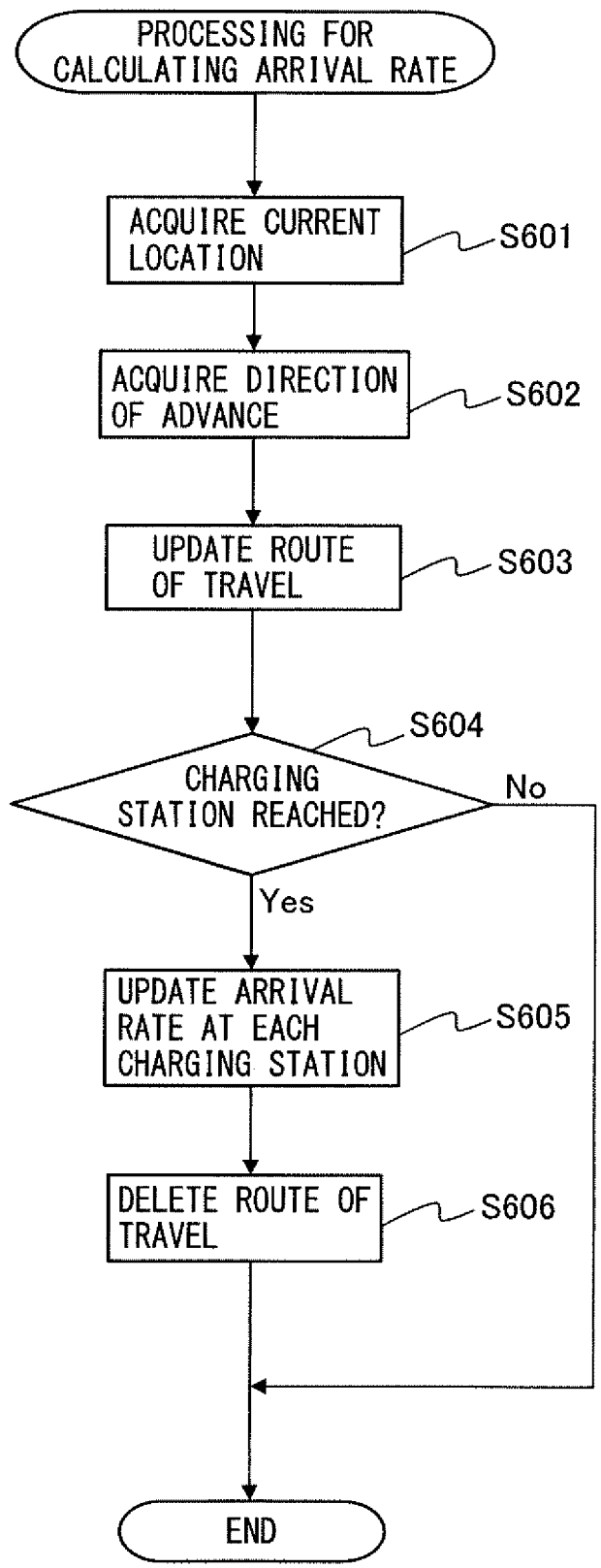
FIG. 10 is a flow chart showing a control routine of processing for calculating an arrival rate in a fourth embodiment of the present invention.

FIG. 10 is a flow chart showing a control routine of processing for calculating an arrival rate in the fourth embodiment of the present invention. In the present control routine, the arrival rate at each charging station is calculated. The present control routine is repeatedly executed by the ECU 40 at predetermined time intervals.

First, at step S601, the arrival rate calculating part 43 acquires the current location of the vehicle 1. The current location of the vehicle 1 is detected by the GPS receiver 52. Next, at step S602, the arrival rate calculating part 43 acquires the direction of advance of the vehicle 1. The direction of advance of the vehicle 1 is detected based on the change along with time of the current location of the vehicle 1. Note that, the direction of advance of the vehicle 1 may be detected by a gyrosensor etc., provided at the vehicle 1.

Next, at step S603, the arrival rate calculating part 43 updates the route of travel until the vehicle 1 reaches the charging station based on the current position and direction of advance of the vehicle 1. The route of travel is stored in the memory of the ECU 40. Next, at step S604, the arrival rate calculating part 43 judges whether the vehicle 1 has reached the charging station. For example, the arrival rate calculating part 43 judges that the vehicle 1 has reached the charging station if the vehicle 1 stops at the charging station. Note that, the arrival rate calculating part 43 may judge that the vehicle 1 has reached the charging station if the battery 20 is charged at the charging station.

If at step S604 judging that the vehicle 1 has reached the charging station, the present control routine proceeds to step S605. At step S605, the arrival rate calculating part 43 updates the arrival rates at each charging station. Specifically, the arrival rate calculating part 43 updates the arrival rate corresponding to each driving position on the route of travel, raises the arrival rate at the charging station which the vehicle 1 reaches by exactly a predetermined value, and lowers the arrival rates at other charging stations by exactly a predetermined value. Further, the arrival rate is calculated for each direction of advance and only the arrival rate corresponding to the direction of advance in the route of travel is updated. The arrival rate after updating is stored in the memory of the ECU 40. Note that, in updating of the arrival rate, it is also possible to just increase or just decrease the arrival rate.

Next, at step S606, the arrival rate calculating part 43 deletes the route of travel. That is, the arrival rate calculating part 43 resets the route of travel. If the route of travel is deleted, a new route of travel is again generated after the vehicle 1 departs from the charging station. After step S606, the present control routine is ended. On the other hand, if at step S604 it is judged that the vehicle 1 has not reached the charging station, the present control routine is ended without the arrival rate being updated.

Note that, the route of travel until the vehicle 1 reaches the charging station may be maintained within a predetermined distance. In this case, if the route of travel until the vehicle 1 reaches the charging station reaches a predetermined distance, the stored routes of travel are successively deleted from the older data on so that the route of travel until the vehicle 1 reaches the charging station does not exceed a predetermined distance. The predetermined distance is, for example, set to a distance which can be driven over by the EV mode when the state of charge of the battery 20 is maximum (for example 50 to 60 km).

Further, when the vehicle 1 arrives at a location other than a charging station, the arrival rate corresponding to each driving position on the route of travel until the vehicle 1 reaches that location may be made lower for all of the charging stations. In this case as well, the arrival rate is calculated for each direction of advance and only the arrival rate corresponding to the direction of advance at the route of travel is updated.

<Processing for Calculating Target SOC>

Figure 11:
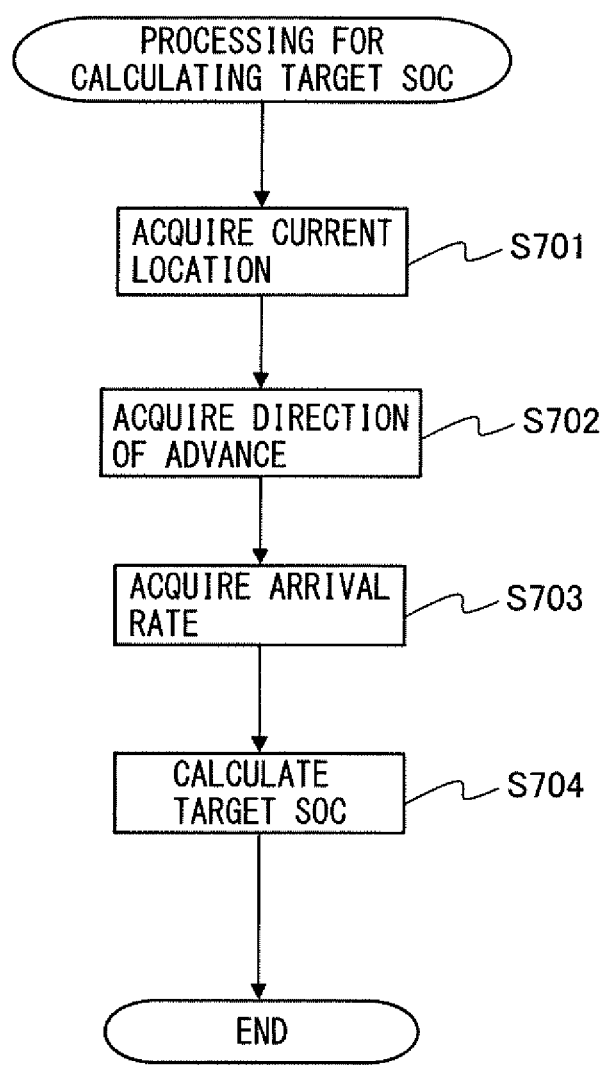
FIG. 11 is a flow chart showing a control routine of processing for calculating a target SOC in the fourth embodiment of the present invention.

FIG. 11 is a flow chart showing a control routine of processing for calculating a target SOC in the fourth embodiment of the present invention. In the present control routine, the target SOC is calculated. The present control routine is performed for each registered charging station and is repeatedly executed by the ECU 40 at predetermined time intervals.

First, at step S701, the target SOC setting part 42 acquires the current location of the vehicle 1, that is, the driving position of the vehicle 1. The driving position of the vehicle 1 is detected by the GPS receiver 52. Next, at step S702, the target SOC setting part 42 acquires the direction of advance of the vehicle 1. The direction of advance of the vehicle 1 is detected based on the change along with time of the current location of the vehicle 1. Note that, the direction of advance of the vehicle 1 may be detected by a gyrosensor etc., provided at the vehicle 1.

Next, at step S703, the target SOC setting part 42 acquires the arrival rate corresponding to the current driving position and direction of advance of the vehicle 1. Next, at step S704, in the same way as step S202 of FIG. 5, the target SOC setting part 42 calculates the target SOC based on the arrival rate. After step S704, the present control routine is ended.

Note that, in the fourth embodiment as well, in the same way as the first embodiment, a control routine of processing for setting the driving mode of FIG. 7 is performed.

Fifth Embodiment

The control device of a hybrid vehicle according to a fifth embodiment is basically similar in configuration and control to the control device of a hybrid vehicle according to the first embodiment except for the points explained below. For this reason, below, the fifth embodiment of the present invention will be explained focusing on parts different from the first embodiment.

Figure 12:
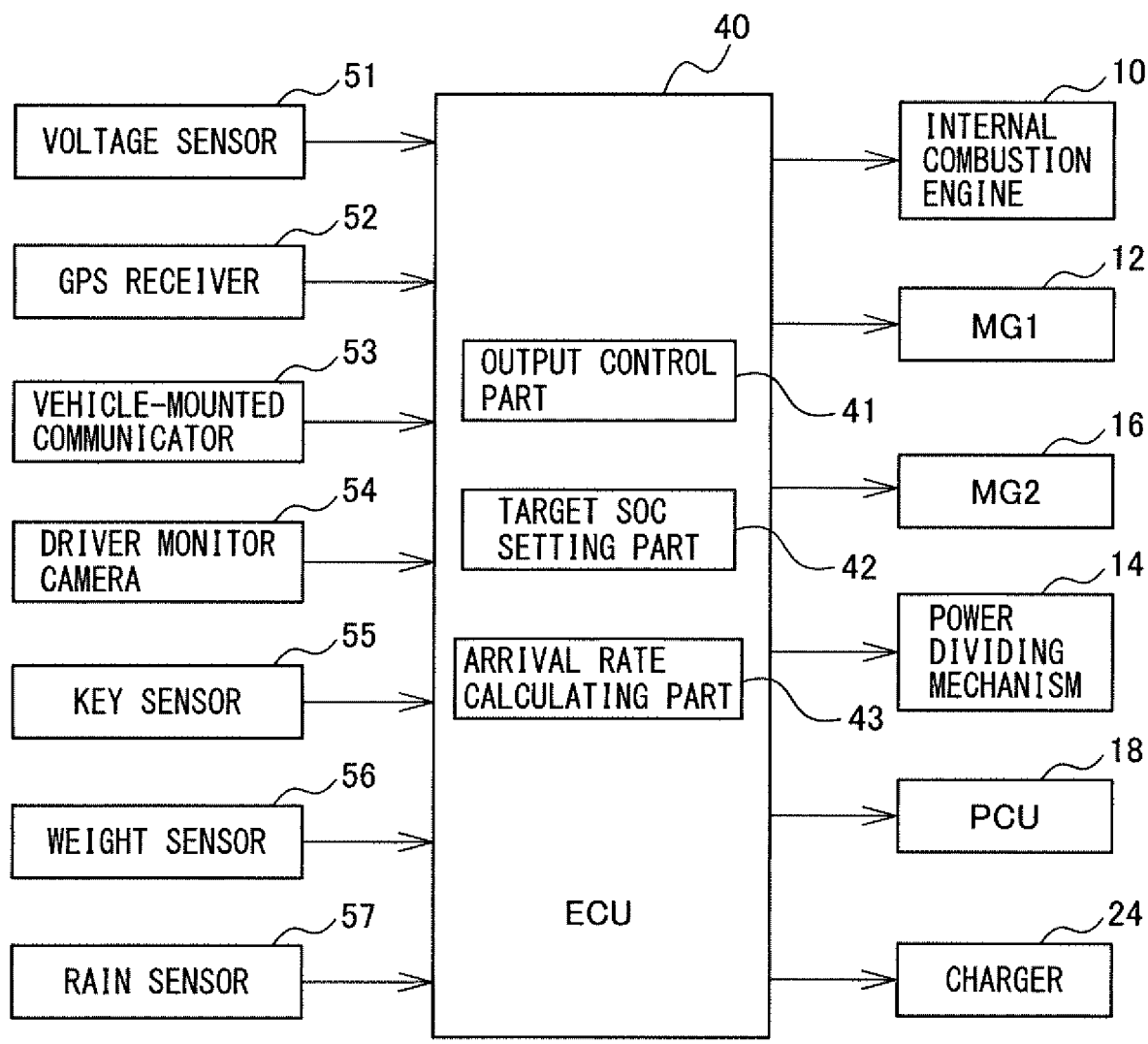
FIG. 12 is a block diagram schematically showing the configuration of a control device of a hybrid vehicle etc., according to a fifth embodiment of the present invention.

FIG. 12 is a block diagram schematically showing the configuration of a control device of a hybrid vehicle etc., according to the fifth embodiment of the present invention. In the fifth embodiment, in addition to the voltage sensor 51 and GPS receiver 52, the outputs of the vehicle-mounted communicator 53, driver monitor camera 54, key sensor 55, weight sensor 56, and rain sensor 57 are input to the ECU 40.

The vehicle-mounted communicator 53 wirelessly communicates with the wireless base station and acquires weather information, congestion information, etc. from external servers. The vehicle-mounted communicator 53 is connected to the ECU 40. The output of the vehicle-mounted communicator 53 is transmitted to the ECU 40.

The driver monitor camera 54 captures an image of the face of the driver of the vehicle 1 to generate a facial image of the driver. The driver monitor camera 54 is, for example, provided at the top of the steering column of the vehicle 1. The driver monitor camera 54 is connected to the ECU 40. The output of the driver monitor camera 54 is transmitted to the ECU 40.

The key sensor 55 detects the information of a plurality of keys of the vehicle 1. Based on the information of the plurality of keys, it is possible to identify the current driver from a plurality of drivers having keys. The key sensor 55 is connected to the ECU 40. The output of the key sensor 55 is transmitted to the ECU 40.

The weight sensor 56 detects the weight of the load carried on a seat of the vehicle 1. Based on the weight of the load carried on the seat, it can be judged whether a person is sitting on the seat. The weight sensor 56 is connected to the ECU 40. The output of the weight sensor 56 is transmitted to the ECU 40.

The rain sensor 57 detects whether or not there is any precipitation due to rain. The rain sensor 57 is connected to the ECU 40. The output of the rain sensor 57 is sent to the ECU 40.

In this regard, the arrival rate changes according to various factors. For example, if the weather is rain, charging at a charging station with no roof is avoided. Further, if the vehicle 1 is driven by a plurality of drivers, the behavior pattern differs for each driver, so there is a high possibility of the arrival rate differing for each driver. Further, if the vehicle 1 is carrying children, there is a possibility of the behavior pattern of the driver changing. Further, there is a possibility of the arrival rate changing according to the day of week or hours.

For this reason, in the fifth embodiment, the arrival rate calculating part 43 calculates the arrival rate for each state of the vehicle environment differing in at least one of the hours, day of week, weather, driver, and number of passengers when the vehicle 1 is being driven near the charging station. Due to this, the target SOC can be set to a suitable value corresponding to the state of the vehicle environment.

<Processing for Calculating Arrival Rate>

Figure 13:
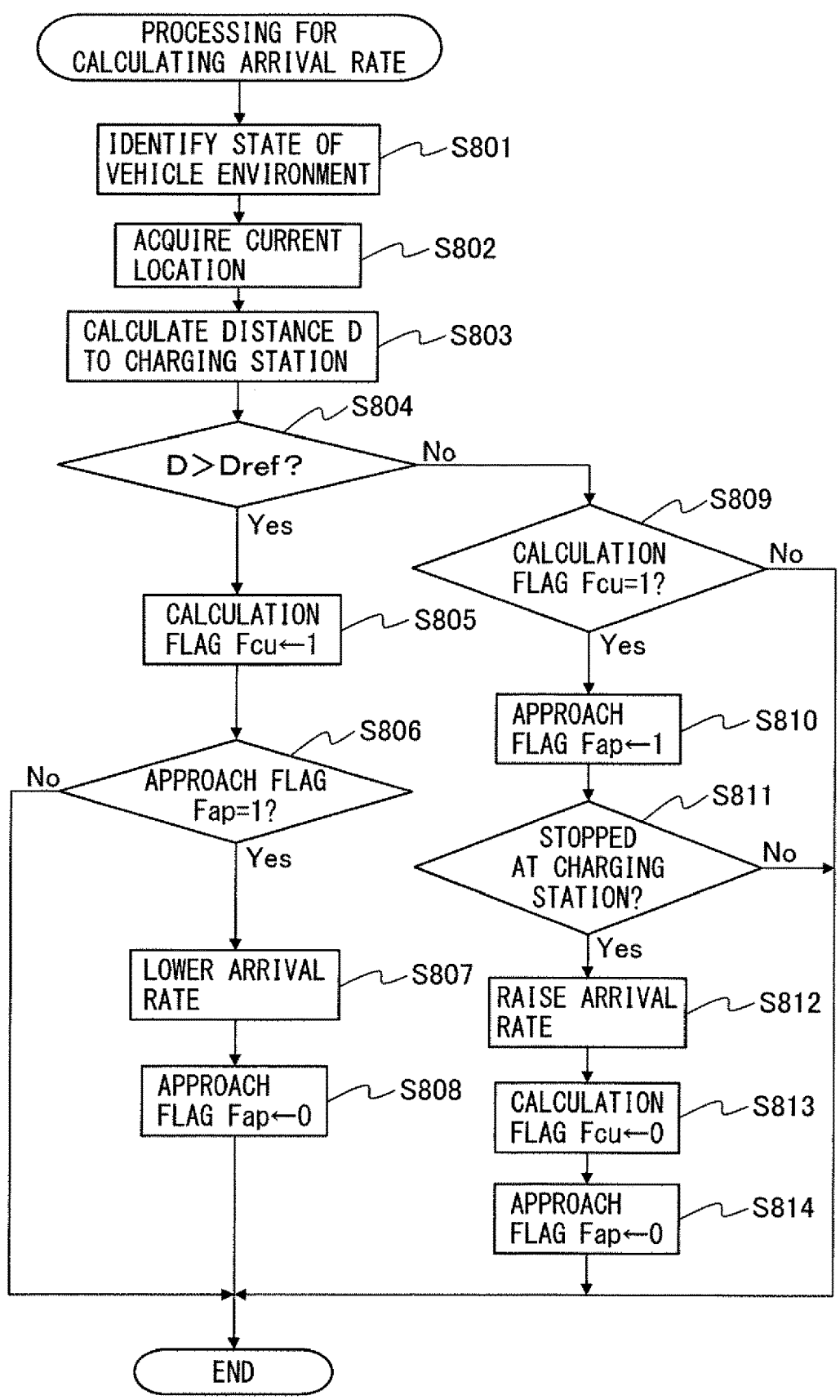
FIG. 13 is a flow chart showing a control routine of processing for calculating an arrival rate in the fifth embodiment of the present invention.

FIG. 13 is a flow chart showing a control routine of processing for calculating an arrival rate in the fifth embodiment of the present invention. In the present control routine, the arrival rate is calculated. The present control routine is performed for each registered charging station and is repeatedly executed by the ECU 40 at predetermined time intervals.

First, at step S801, the arrival rate calculating part 43 acquires at least one of the hours, day of week, weather, driver information and number of passengers, and identifies the state of the vehicle environment. The hours and day of week are, for example, detected by a digital clock housed inside the ECU 40. The weather is detected by the rain sensor 57. Note that, the hours, day of week, and weather may be acquired by receiving information through the vehicle-mounted communicator 53 from an external server.

The driver information is acquired from a facial image of the driver generated by the driver monitor camera 54. Note that, the driver information may be acquired from key information detected by the key sensor 55. Further, the number of passengers is estimated based on the output of the weight sensor 56.

Step S802 to step S814 are similar to step S101 to step S113 of FIG. 4, so explanations will be omitted. The arrival rate updated at step S807 or step S812 is stored in the memory of the ECU 40 for each state of the vehicle environment. Note that, the present control routine can be modified in the same way as the control routine of FIG. 4.

Further, when the driver of the vehicle 1 is changed, the arrival rate at the charging station may fluctuate particularly greatly. For this reason, the arrival rate calculating part 43 may identify the driver of the vehicle 1 and calculate the arrival rate for each driver of the vehicle 1 at step S601.

Note that, in the fifth embodiment as well, in the same way as the first embodiment, the control routine of the processing for calculating the target SOC of FIG. 5 and the control routine of the processing for setting the driving mode of FIG. 7 are performed.

Sixth Embodiment

The control device of a hybrid vehicle according to a sixth embodiment is basically similar in configuration and control to the control device of a hybrid vehicle according to the first embodiment except for the points explained below. For this reason, below, the sixth embodiment of the present invention will be explained focusing on parts different from the first embodiment.

As explained above, the arrival rate changes in accordance with the state of the vehicle environment. For this reason, in the sixth embodiment, the arrival rate calculating part 43 calculates the arrival rate considering at least one of the conditions when the vehicle 1 is being driven near the charging station such as the hours, day of week, weather, driver, and number of passengers. Specifically, the arrival rate calculating part 43 corrects the arrival rate based on state of the vehicle environment where at least one of the conditions when the vehicle 1 is being driven near the charging station such as the hours, day of week, weather, driver, and number of passengers differs, and calculates the corrected arrival rate as the final arrival rate.

<Processing for Correcting Arrival Rate>

FIG. 14 is a flow chart showing a control routine of processing for correcting the arrival rate in a sixth embodiment of the present invention. In the sixth embodiment as well, the control routine of FIG. 4 is executed. In the present control routine, the arrival rate calculated at the control routine of FIG. 4 is corrected. The present control routine is performed for each registered charging station and is repeatedly executed by the ECU 40 at predetermined time intervals.

First, at step S901, the arrival rate calculating part 43 identifies the state of the vehicle environment in the same way as step S801 of FIG. 13. Note that, in the sixth embodiment, in the same way as the fifth embodiment, in order to identify the state of the vehicle environment, in addition to the voltage sensor 51 and GPS receiver 52, the outputs of the vehicle-mounted communicator 53, driver monitor camera 54, key sensor 55, weight sensor 56, and rain sensor 57 are input to the ECU 40.

Next, at step S902, the arrival rate calculating part 43 corrects the arrival rate calculated at the control routine of FIG. 4 based on the state of the vehicle environment. For example, the arrival rate calculating part 43 lowers the arrival rate by exactly a predetermined value when the weather is rain. Further, the arrival rate calculating part 43 may lower the arrival rate by exactly a predetermined value when the number of passengers is two or more. Further, the arrival rate calculating part 43 may change the arrival rate to 0% at the time of a day of week or hours when a charging station cannot be utilized. Further, the arrival rate calculating part 43 may correct the arrival rate in accordance with the behavior pattern specific to the driver. After step S902, the present control routine is ended.

Note that, in the sixth embodiment, in the same way as the first embodiment, the control routine of the processing for calculating the target state of charge of FIG. 5 and the control routine of the processing for setting the driving mode of FIG. 7 are performed. In the control routine of the processing for calculating the target SOC of FIG. 5, at step S202, the target SOC is calculated based on the final arrival rate calculated at step S902 of FIG. 14.

Other Embodiments

Above, preferable embodiments according to the present invention were explained, but the present invention is not limited to these embodiments. Various corrections and changes can be made within the scope of the claims.

For example, the first motor generator 12 may be a generator not functioning as a motor. Further, the second motor generator 16 may be a motor not functioning as a generator.

Further, the hybrid vehicle 1 in the present embodiment is a so-called series parallel type hybrid vehicle. However, if the battery can be charged by an external power source, the hybrid vehicle 1 may be a so-called series type, parallel type, or other type of hybrid vehicle.

Further, the above embodiments can be worked freely combined. For example, the second embodiment can be combined with the third embodiment, the fifth embodiment, or the sixth embodiment.

If the second embodiment and the third embodiment are combined, at step S511 of FIG. 9, in the same way as step s410 of FIG. 8, the arrival rate calculating part 43 judges whether the battery 20 has been charged at a charging station. When the second embodiment and the fifth embodiment are combined, at step S811 of FIG. 13, in the same way as step S410 of FIG. 8, the arrival rate calculating part 43 judges whether the battery 20 has been charged at a charging station. If the second embodiment and the sixth embodiment are combined, at step S902 of FIG. 14, the arrival rate calculating part 43 corrects the arrival rate calculated at the control routine of FIG. 8 based on the state of the vehicle environment.

Further, the fourth embodiment can be combined with the fifth embodiment or the sixth embodiment. If the fourth embodiment and the fifth embodiment are combined, before step S601 of FIG. 10, in the same way as step S801 of FIG. 13, the arrival rate calculating part 43 acquires at least one of the hours, day of week, weather, driver information, and number of passengers and identifies the state of the vehicle environment. In this case, the arrival rate is calculated for each state of the vehicle environment. If the fourth embodiment and the sixth embodiment are combined, at step S902 of FIG. 14, the arrival rate calculating part 43 corrects the arrival rate calculated at the control routine of FIG. 10 based on the state of the vehicle environment.

Further, the third embodiment can be combined with the fifth embodiment or the sixth embodiment. Further, the second embodiment can be combined with the third embodiment and the fifth embodiment or the third embodiment and the sixth embodiment.

REFERENCE SIGNS LIST

1 hybrid vehicle
10 internal combustion engine
12 first motor generator
16 second motor generator
20 battery
40 electronic control unit (ECU)
41 output control part
42 target SOC setting part
43 arrival rate calculating part
70 external power source.

The invention claimed is:

1. A control device of a hybrid vehicle for controlling a hybrid vehicle comprising an internal combustion engine, a motor, and a battery configured to supply electric power to the motor and configured to be charged by output of the internal combustion engine and an external power source, the control device of a hybrid vehicle comprising:
a processor configured to
control outputs of the internal combustion engine and the motor,
set a target state of charge which is a target value of a state of charge of the battery when the hybrid vehicle reaches a predetermined charging station,
calculate a probability of the hybrid vehicle reaching the charging station,
when the hybrid vehicle is being driven outside the charging station, control outputs of the internal combustion engine and the motor so that the state of charge of the battery when the hybrid vehicle reaches the charging station becomes the target state of charge, and
lower the target state of charge as the probability increases and increase the target state of charge as the probability decreases.

2. The control device of the hybrid vehicle according to claim 1, wherein the processor is configured to raise the probability the higher a frequency at which the hybrid vehicle has stopped at the charging station when being driven near the charging station.

3. The control device of the hybrid vehicle according to claim 1, wherein the processor is configured to raise the probability the higher a frequency at which the battery has been charged by the external power source at the charging station when the hybrid vehicle is being driven near the charging station.

4. The control device of the hybrid vehicle according to claim 1, wherein when the hybrid vehicle reaches the charging station, the processor is configured to update the probability to correspond to a driving position and a direction of advance of the hybrid vehicle based on a route of travel until the hybrid vehicle reaches the charging station.

5. The control device of the hybrid vehicle according to claim 1, wherein the processor is configured to calculate the probability for each state of a vehicle environment differing in at least one of hours, day of week, weather, driver, and number of passengers when the hybrid vehicle is being driven near the charging station.

6. The control device of the hybrid vehicle according to claim 1, wherein the processor is configured to calculate the probability considering at least one of hours, day of week, weather, driver, and number of passengers when the hybrid vehicle is being driven near the charging station.

7. The control device of the hybrid vehicle according to claim 1, wherein the processor is configured to linearly lower the target state of charge as the probability becomes higher.

8. The control device of the hybrid vehicle according to claim 1, wherein the processor is configured to lower the target state of charge in stages as the probability becomes higher.

9. The control device of the hybrid vehicle according to claim 2, wherein the processor is configured to raise the probability if the hybrid vehicle stops at the charging station when being driven near the charging station, and lower the probability if the hybrid vehicle does not stop at the charging station when being driven near the charging station.

10. The control device of the hybrid vehicle according to claim 9, wherein the processor is configured to not lower the probability if the state of charge of the battery is equal to or more than a predetermined value even if the hybrid vehicle does not stop at the charging station when being driven near the charging station.

11. The control device of the hybrid vehicle according to claim 10, wherein the processor is configured to not raise the probability if the state of charge of the battery is equal to or more than the predetermined value even if the hybrid vehicle stops at the charging station when being driven near the charging station.

12. The control device of the hybrid vehicle according to claim 3, wherein the processor is configured to raise the probability if the battery is charged by the external power source at the charging station when the hybrid vehicle is being driven near the charging station, and lower the probability if the battery is not charged by the external power source at the charging station when the hybrid vehicle is being driven near the charging station.

13. The control device of the hybrid vehicle according to claim 12, wherein the processor is configured to not lower the probability if the state of charge of the battery is equal to or more than a predetermined value even if the battery is not charged by the external power source at the charging station when the hybrid vehicle is being driven near the charging station.

14. The control device of the hybrid vehicle according to claim 13, wherein the processor is configured to not raise the probability if the state of charge of the battery is equal to or more than the predetermined value even if the battery is charged by the external power source at the charging station when the hybrid vehicle is being driven near the charging station.

15. The control device of the hybrid vehicle according to claim 5, wherein the processor is configured to calculate the probability for each driver of the hybrid vehicle.

16. A control device for controlling a hybrid vehicle comprising an internal combustion engine, a motor, and a battery configured to supply electric power to the motor and configured to be charged by output of the internal combustion engine and an external power source, the control device comprising:

an output control part configured to control outputs of the internal combustion engine and the motor, a target state of charge setting part configured to set a target state of charge which is a target value of a state of charge of the battery when the hybrid vehicle reaches a predetermined charging station, an arrival rate calculating part configured to calculate a probability of the hybrid vehicle reaching the charging station, when the hybrid vehicle is being driven outside the charging station, the output control part is configured to control outputs of the internal combustion engine and the motor so that the state of charge of the battery when the hybrid vehicle reaches the charging station becomes the target state of charge, and the target state of charge setting part is configured to lower the target state of charge as the probability increases and increase the target state of charge as the probability decreases.

* * * * *